Oct. 29, 1929.　　L. J. DEUEL ET AL　　1,733,948
WINDSHIELD WIPER
Filed July 7, 1927
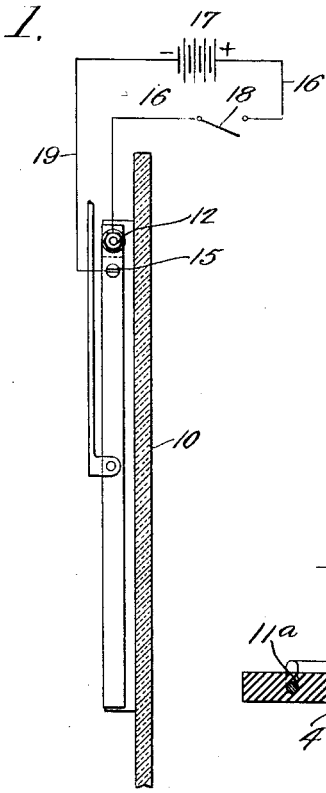
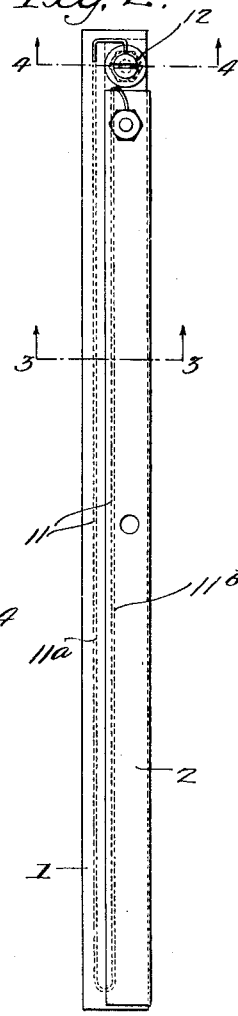
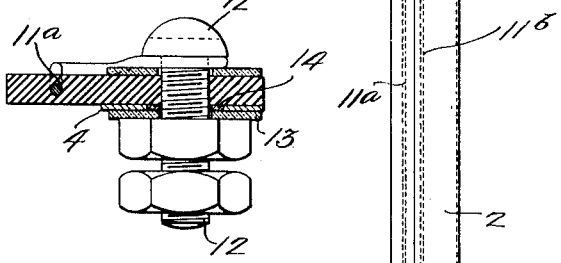
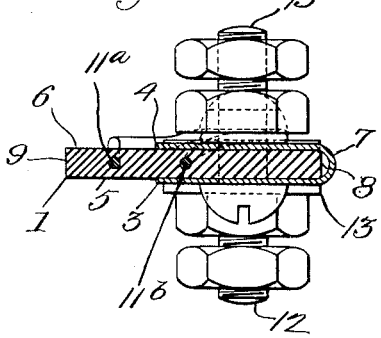
Inventor:
Luther J. Deuel,
Clyde R. Higgins,
by his Attorneys,
Howson & Howson Patented Oct. 29, 1929

1,733,948

UNITED STATES PATENT OFFICE

LUTHER J. DEUEL AND CLYDE R. HIGGINS, OF MEDFORD, OREGON

WINDSHIELD WIPER

Application filed July 7, 1927. Serial No. 204,087.

Our invention relates to wind-shield wipers, and the principal object of our invention is to provide a wiping element which can be heated and thereby keep the windshield free of ice and sleet, within the range of the wiping element.

Referring to the drawing:

Fig. 1 is a sectional elevation through a wind-shield glass showing the wiper in an operating position relative thereto;

Fig. 2 is a detached elevation of the wiper element;

Fig. 3 is an enlarged section taken on the line 3—3 of Fig. 2; and

Fig. 4 is a sectional view taken on the line 4—4 of Fig. 2.

Our improved wind-shield wiper comprises a flexible strip 1 formed of material, non-conductive of electricity, such as rubber. The strip 1 is provided adjacent one of its longitudinal edges with a stiffening element 2 which extends substantially the full length of said strip. The stiffening element 2 is of a U-shaped form in cross-section. The respective legs 3 and 4 of the said U-shaped element embrace the opposite flat sides 5 and 6 respectively of the strip 1. The legs 3 and 4 are integrally connected by a semi-circular portion 7 which encloses the edge 8 of the strip 1. The edge 9 of the strip 1 is adapted to engage the outer face of the wind-shield glass 10.

The wiping element is adapted to be moved, in any desired manner and by any suitable means, relative to said wind-shield glass, for the removal of rain, etc. from the wind-shield. In order to prevent the formation of ice on the wind-shield in extremely cold weather when rain or mist, etc. strikes the wind-shield, I have provided the strip 1 with a heating element 11.

The heating element 11 comprises a continuous wire of high electric resistive qualities which will heat up rapidly when an electric current is passed therethrough. One portion 11$^a$ of this wire is positioned adjacent and parallel to the wiping edge 9 of strip 1; the second or return portion 11$^b$ is positioned parallel to the portion 11$^a$ and removed a slight distance therefrom. The entire heating element is embedded within the strip 1, which forms an insulation between the component parts of the heating element.

The end of the portion 11$^a$ is connected to a terminal post 12, which passes through the strip 1, and the leg 4 of the stiffening element 2. Insulating washers 13, 13 and an insulating bushing 14 encircle the post 12 and prevent the electric current from passing directly from the post 12 to the stiffening element 2.

The end of the portion 11$^b$ is connected to the stiffening element 2 by means of a binding post 15; the end of the portion 11$^b$ of the heating element is thereby grounded on the metal portion of the wiper. The end of the portion 11$^a$ is connected by means of a conductor 16, attached to the binding post 12, to the positive side of a source of current 17, a switch 18 being connected in series between the said source of current and the heating element.

It is to be understood that the negative side of the source of current is connected to the frame of the automobile. As a matter of convenience of illustration, the binding post 15 is shown as being connected to the negative side of the source of current, by means of a conductor 19.

In operation, by closing the switch 18 an electric current is passed from the source of supply 17 to the heating element 11, which immediately warms the wiping strip 1 to such an extent that when the said wiping element is reciprocated or oscillated relative to the wind-shield 10 the formation of ice is prevented on said wind-shield, or if such ice has been formed thereon while the car was parked, the heat in the strip 1 will be sufficient to remove such ice, and thereafter keep the temperature of the glass of the wind-shield at a point above freezing.

It will be understood that the amount of current intended to be used is sufficient to heat the rubber, but not to melt it.

Our improved wiping element is so constructed that it may be placed in any of the existing non-heated wind-shield cleaners and does not require special construction of the other elements constituting the complete cleaning device.

The heating element 11 is preferably placed between two separate strips of unvulcanized live rubber and thereafter the said strips are vulcanized into one integral mass with the heating element embedded therein, and the stiffening element subsequently placed along one of its edges.

We claim:

A wind-shield wiping element comprising a substantially flat strip of rubber having a heating wire rigidly embedded therein, parallel and adjacent to one longitudinal edge thereof.

LUTHER J. DEUEL.
CLYDE R. HIGGINS.